(12) United States Patent
Aulick (10) Patent No.: US 8,579,353 B1
(45) Date of Patent: Nov. 12, 2013

(54) RETRACTABLE TARP COVER SYSTEM

(76) Inventor: Vinc L. Aulick, Scottsbluff, NE (US)

( * ) Notice: Subject to any disclaimer, the term of this patent is extended or adjusted under 35 U.S.C. 154(b) by 42 days.

(21) Appl. No.: 13/494,350

(22) Filed: Jun. 12, 2012

(51) Int. Cl.
*B60P 7/04* (2006.01)

(52) U.S. Cl.
USPC .............................. 296/100.12; 296/100.18

(58) Field of Classification Search
USPC ........ 296/100.11, 100.12, 100.18; 160/84.02, 160/84.06
See application file for complete search history.

(56) References Cited

U.S. PATENT DOCUMENTS

| | | | |
|---|---|---|---|
| 3,942,830 A | 3/1976 | Woodard | |
| 3,986,749 A * | 10/1976 | Hull et al. | 296/100.09 |
| 5,080,423 A | 1/1992 | Merlot et al. | |
| 5,102,182 A | 4/1992 | Haddad, Jr. | |
| 5,253,914 A * | 10/1993 | Biancale | 296/100.13 |
| 5,440,183 A * | 8/1995 | Denne | 310/12.26 |
| 5,873,210 A * | 2/1999 | Brumleve | 296/100.17 |
| 5,938,270 A | 8/1999 | Swanson et al. | |
| 6,142,554 A | 11/2000 | Carroll et al. | |
| 6,481,779 B1 | 11/2002 | Gothier et al. | |
| 6,582,007 B2 | 6/2003 | Gothier et al. | |
| 6,893,072 B1 * | 5/2005 | Graves | 296/100.12 |
| 7,367,606 B2 * | 5/2008 | Ellis | 296/100.13 |
| 7,484,789 B1 * | 2/2009 | Aulick | 296/100.11 |
| 2002/0135199 A1 * | 9/2002 | Hanning | 296/105 |

* cited by examiner

*Primary Examiner* — Jason S Morrow
(74) *Attorney, Agent, or Firm* — Dennis L. Thomte; Thomte Patent Law Office LLC (57) ABSTRACT

A retractable tarp cover for a truck, trailer body or other equipment is adapted to be moved from a retracted position at the front of the truck, trailer body or other equipment to an extended position at the rear of the truck, trailer body or other equipment by means of a rodless cylinder at each side thereof. The tarp is also movable from its extended position to a retracted position.

16 Claims, 6 Drawing Sheets

RETRACTABLE TARP COVER SYSTEM

BACKGROUND OF THE INVENTION

1. Field of the Invention

This invention relates to a retractable tarp cover system for trucks, trailers, coal cars or any other pieces of equipment requiring tarps, and more particularly to a retractable tarp cover system which is moved between its retracted to extended positions and vice versa by means of a rodless cylinder assembly at each side thereof.

2. Description of the Related Art

For many years, flexible tarps have been used to cover the tops of truck or trailer bodies. In the earliest days, the flexible tarp was extended over the upper end of the truck body with the front, rear and side edges thereof being secured to the body by ropes or the like. In recent years, many different types of tarp cover systems have been provided for positioning and securing a flexible tarp over the upper end of a truck or trailer body. For example, see U.S. Pat. Nos. 3,942,830; 5,102,182; 5,938,270; 6,142,554; 6,481,779; and 6,582,007.

It is believed that each of the above prior art systems suffers from certain disadvantages or shortcomings. For example, in the crank operated tarp systems, the manual cranking of the tarp from its retracted to extended positions and vice versa could be a strenuous task. In the cable systems, many component parts were required with occasional failures of the pulleys, cables, etc. In the electrically operated cable systems, the pulleys, cables, etc., could fail.

Applicant's retractable tarp cover system, as described and shown in Applicant's U.S. Pat. No. 7,484,789, represents a distinct improvement over the prior art systems set forth above. The instant invention represents an improvement over the system of U.S. Pat. No. 7,484,789 in that the tarp thereof may be moved the full length of the trailer without gears, cables or other mechanical parts.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A retractable tarp cover system is disclosed for trucks, trailers, coal cars or any other pieces of equipment requiring tarps, having front and rear ends and first and second sides having upper ends is disclosed. As used herein, the term "trailer" will refer to a truck as well and vice versa. In addition, the tarp system of this invention may be used to cover coal cars or other pieces of equipment requiring tarps. A first elongated and horizontally disposed tubular support member, having a front end and a rear end, is positioned at the first side of the trailer body at the outer side thereof adjacent the upper end thereof. The front and rear ends of the first support member are secured to the first side of the trailer body at the front and rear ends thereof respectively. A second, elongated and horizontally disposed tubular support member, having a front end and a rear end, is positioned at the second side of the trailer body at the outer side thereof adjacent the upper end thereof. The front and rear ends of the second support member are secured to the second side of the truck body at the front and rear ends thereof respectively. The first and second tubular support members are comprised of a non-magnetic material and may have a square cross-section, a rectangular cross-section, an octagonal or cross-section any other cross-sectional configuration.

A plurality of transversely extending and spaced-apart tarp bows, having first and second ends, are also included in the system. The first ends of the tarp bows are operatively horizontally movably mounted on the first support member in a forwardly and rearwardly direction with respect thereto. The second ends of the tarp bows are operatively horizontally movably mounted on the second support member in a forwardly and rearwardly direction with respect thereto. The tarp bows are positioned on the first and second support members so as to define a front tarp bow and a rear tarp bow with intermediate tarp bows therebetween. The tarp is secured to the tarp bows and extends between the upper ends of the first and second sides of the truck body. The rear end of the tarp is secured to the rear tarp bow for movement therewith. The forward end of the tarp is secured to the trailer body.

A first inner permanent magnet piston is longitudinally movably mounted in the first support member. The first inner permanent magnet piston has a front end and a rear end. A second inner permanent magnet piston is longitudinally movably mounted in the second support member with the second inner permanent magnet piston having a front end and a rear end.

The system includes a control valve which is operatively connected to a source of pressurized fluid such as oil or air. A first fluid conduit has one end thereof in fluid communication with the control valve. The other end of the first fluid conduit is in fluid communication with a second fluid conduit which is in fluid communication with the front ends of the first and second support members forwardly of the inner permanent magnet pistons therein.

A third fluid conduit has one end thereof in fluid communication with the control valve. The other end of the third fluid conduit is in fluid communication with a fourth fluid conduit which is in fluid communication with the rear ends of the first and second support members rearwardly of the inner permanent magnet pistons therein. A first outer permanent magnet extends around the first support member and is longitudinally movably mounted thereon. The first end of the rearward tarp bow is operatively secured to the first outer permanent magnet on the first support member for longitudinal movement therewith.

A second outer permanent magnet extends around the second support member and is longitudinally movably mounted thereon. The second end of the rearward tarp bow is operatively secured to the second outer permanent magnet on the second support member for longitudinal movement therewith.

The first outer permanent magnet is positioned outwardly of the first inner permanent magnet piston whereby longitudinal movement of the first inner permanent magnet piston will cause the first outer permanent magnet to longitudinally move on the first support member thereby causing the first end of the rear tarp bow to longitudinally move with respect to the first support member. The second outer permanent magnet is positioned outwardly of the second inner permanent magnet piston whereby longitudinal movement of the second inner permanent magnet piston will cause the second outer permanent magnet to longitudinally move on the second support member thereby causing the second end of the rear tarp bow to longitudinally move with respect to the second support member.

The control valve is capable of simultaneously supplying pressurized fluid into the front ends of the first and second support members thereby causing the first and second permanent magnet pistons therein to move rearwardly in the first and second support members respectively.

The control valve is also capable of simultaneously supplying pressurized fluid into the rear ends of the first and second support members thereby causing the first and second permanent magnet pistons therein to move forwardly in the first and second support members respectively.

The rearward movement of the first and second inner permanent magnet pistons in the first and second support members respectively causes the tarp to be extended towards the rear end of the truck body. The forward movement of the first and second inner permanent magnet pistons in the first and second support members respectively causes the tarp to retract towards the front end of the truck body.

A principal object of the invention is to provide an improved retractable tarp cover system for any piece of equipment requiring a tarp.

A further object of the invention is to provide an improved retractable tarp cover system for a truck or trailer body wherein the tarp is moved between its extended and retracted positions and vice versa by means of rodless cylinders.

A further object of the invention is to provide a retractable tarp cover system for a truck or trailer body which eliminates the need for manually positioning the tarp over the truck or trailer body.

Still another object of the invention is to provide a retractable tarp cover system for a truck or trailer body which has a reduced number of movable parts.

Yet another object of the invention is to provide a retractable tarp cover system for a truck or trailer body which may be attached to a conventional truck or trailer without extensive modification thereof.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
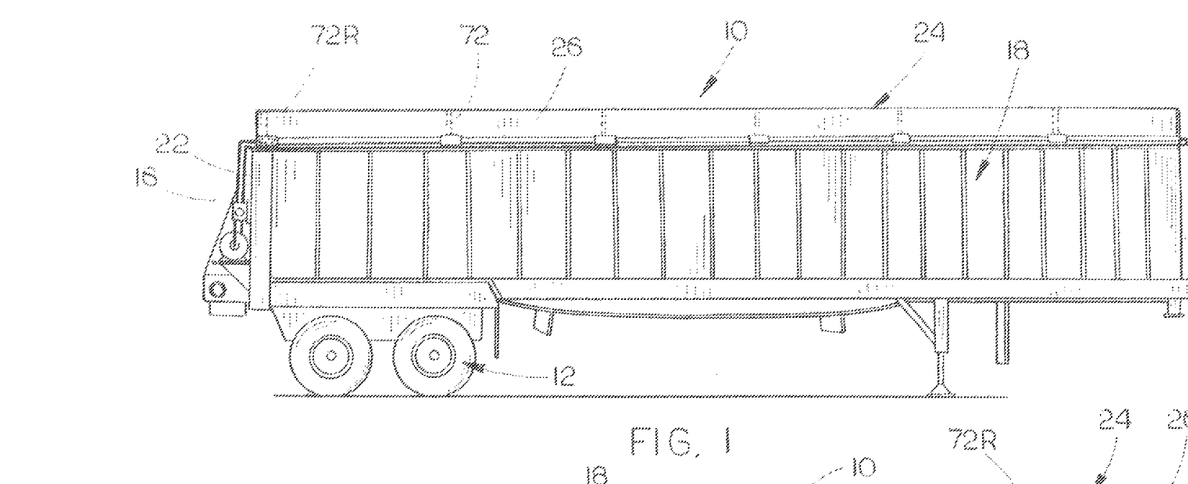
FIG. 1 is a side view of a trailer having the tarp cover system of this invention mounted thereon with the tarp cover being in its extended position.
Figure 2:
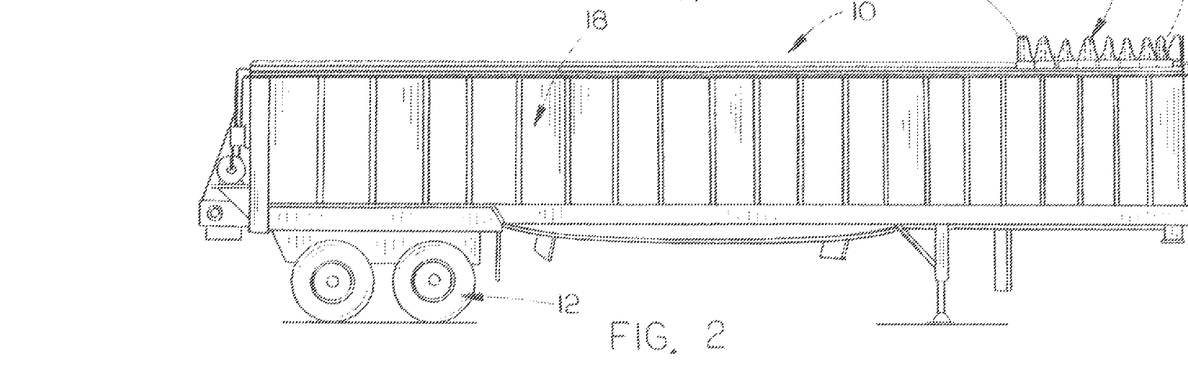
FIG. 2 is a side view of the trailer of FIG. 1 with the tarp cover in a retracted position.
Figure 3:
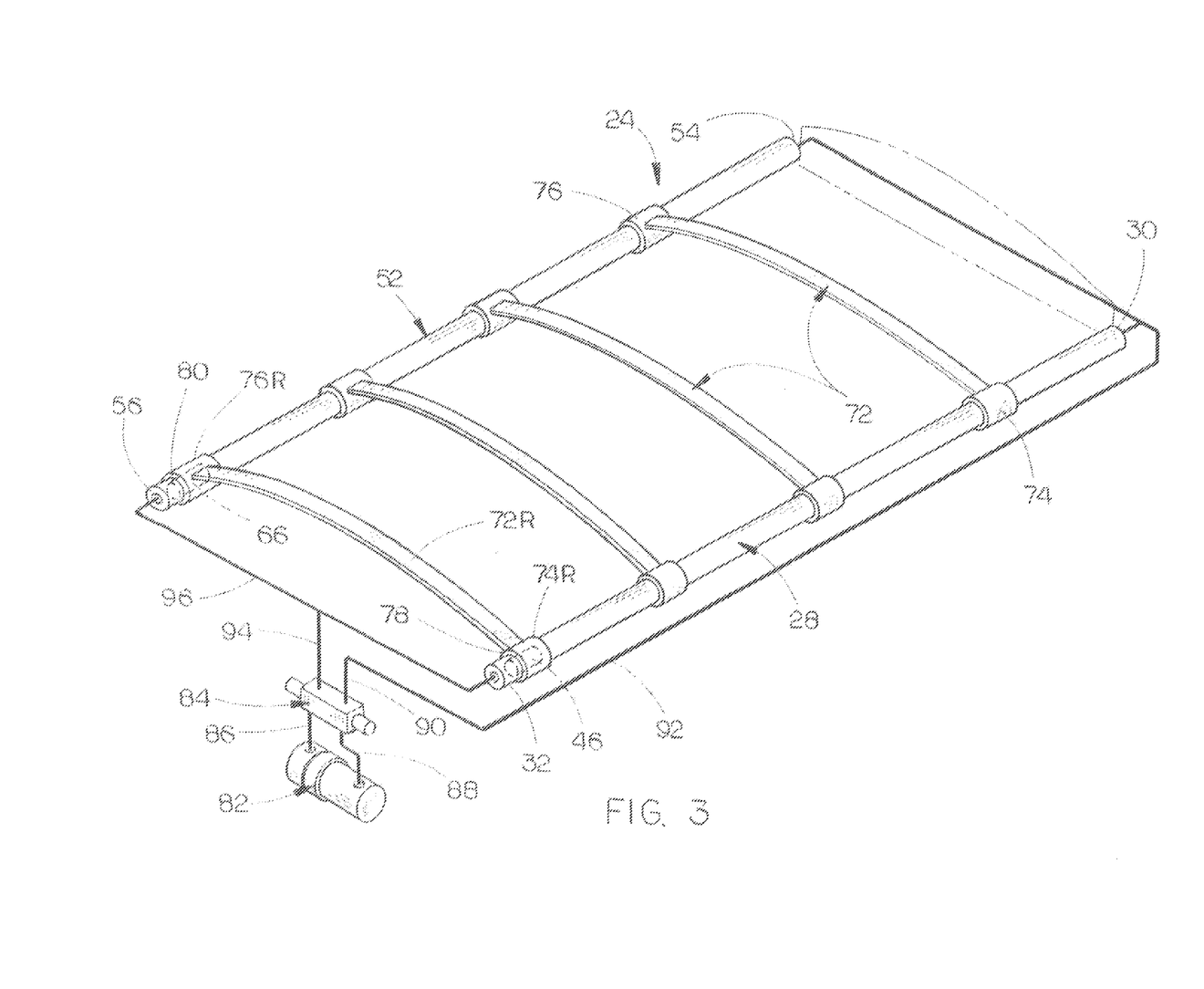
FIG. 3 is a perspective view of a portion of the tarp cover system of this invention.
Figure 4:
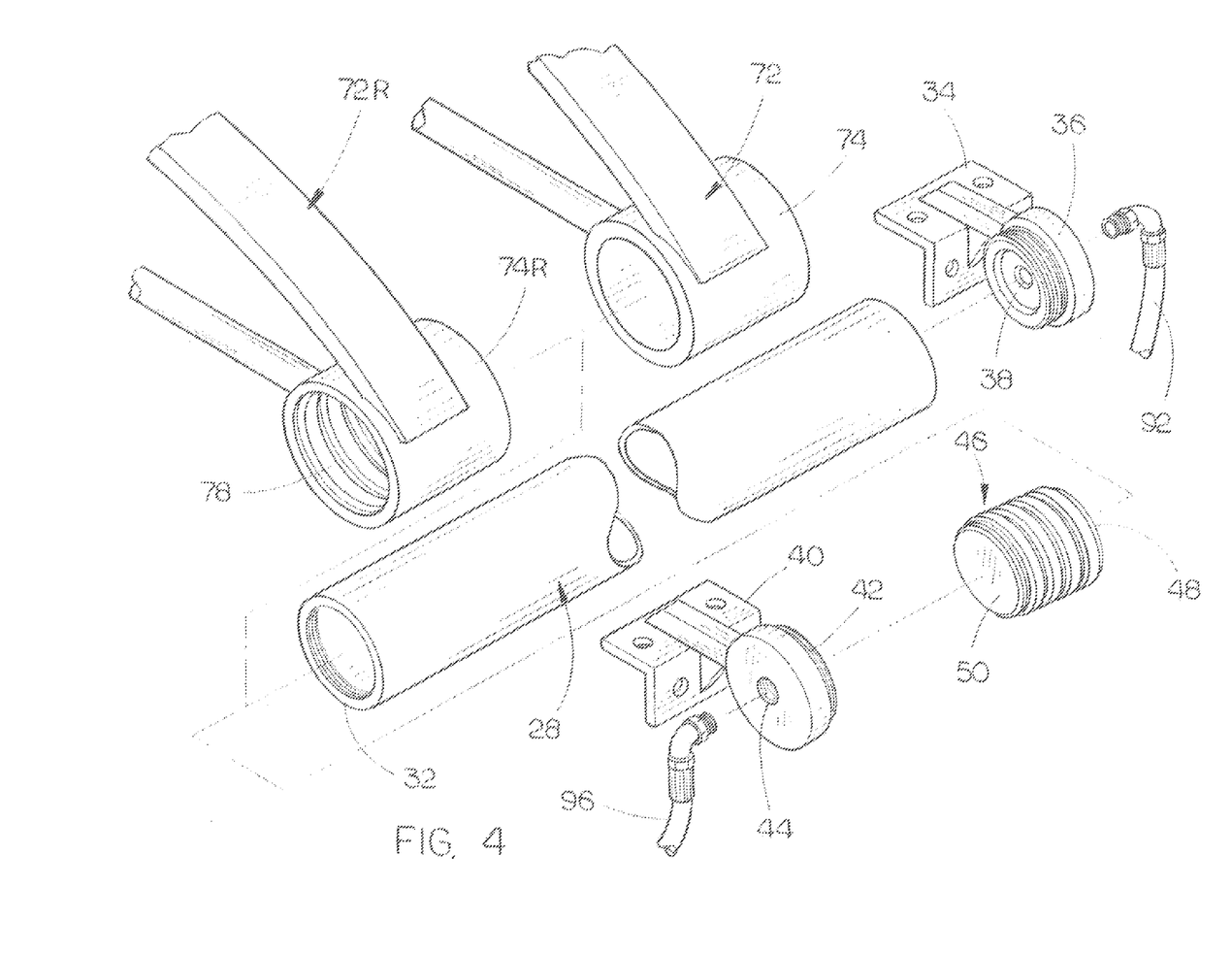
FIG. 4 is a partial rear exploded perspective view of a portion of the tarp cover system of this invention.
Figure 5:
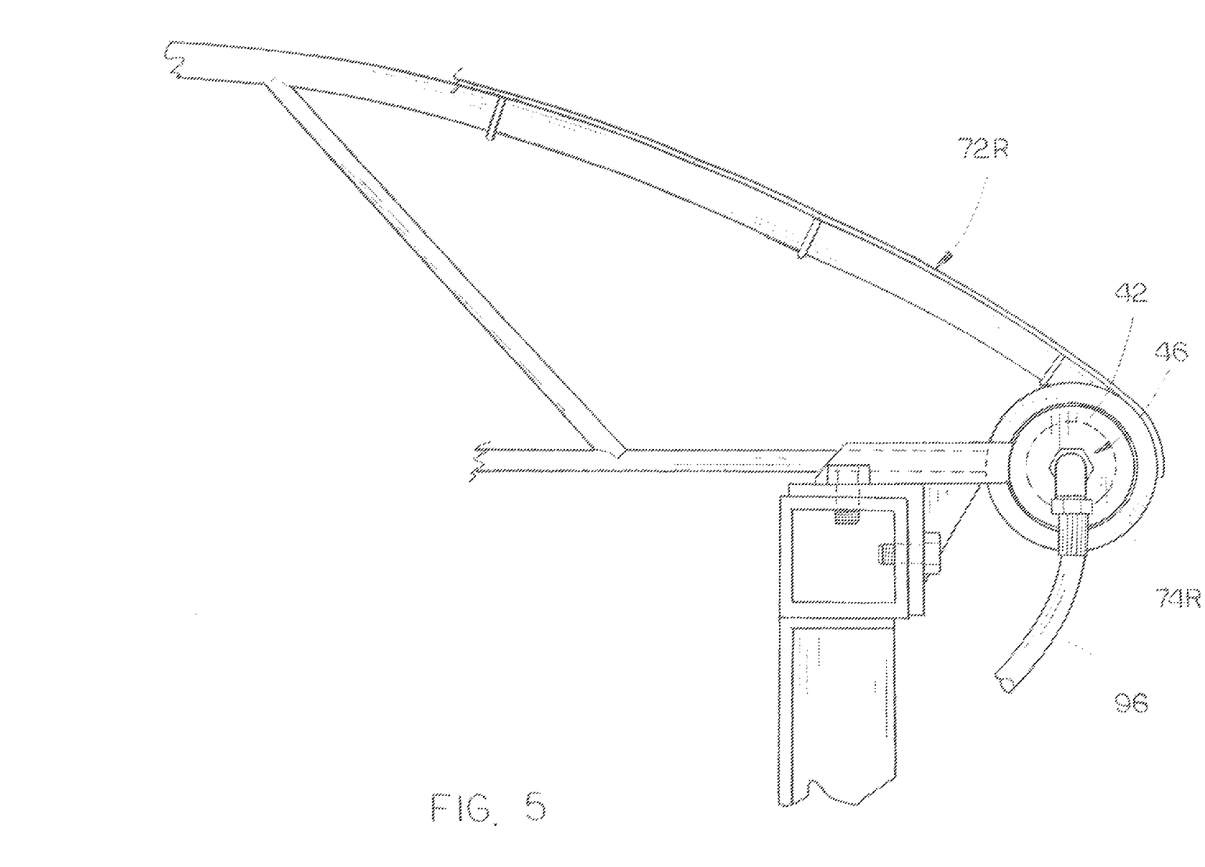
FIG. 5 is a partial front elevational view illustrating a portion of the tarp cover system of this invention.
Figure 6:
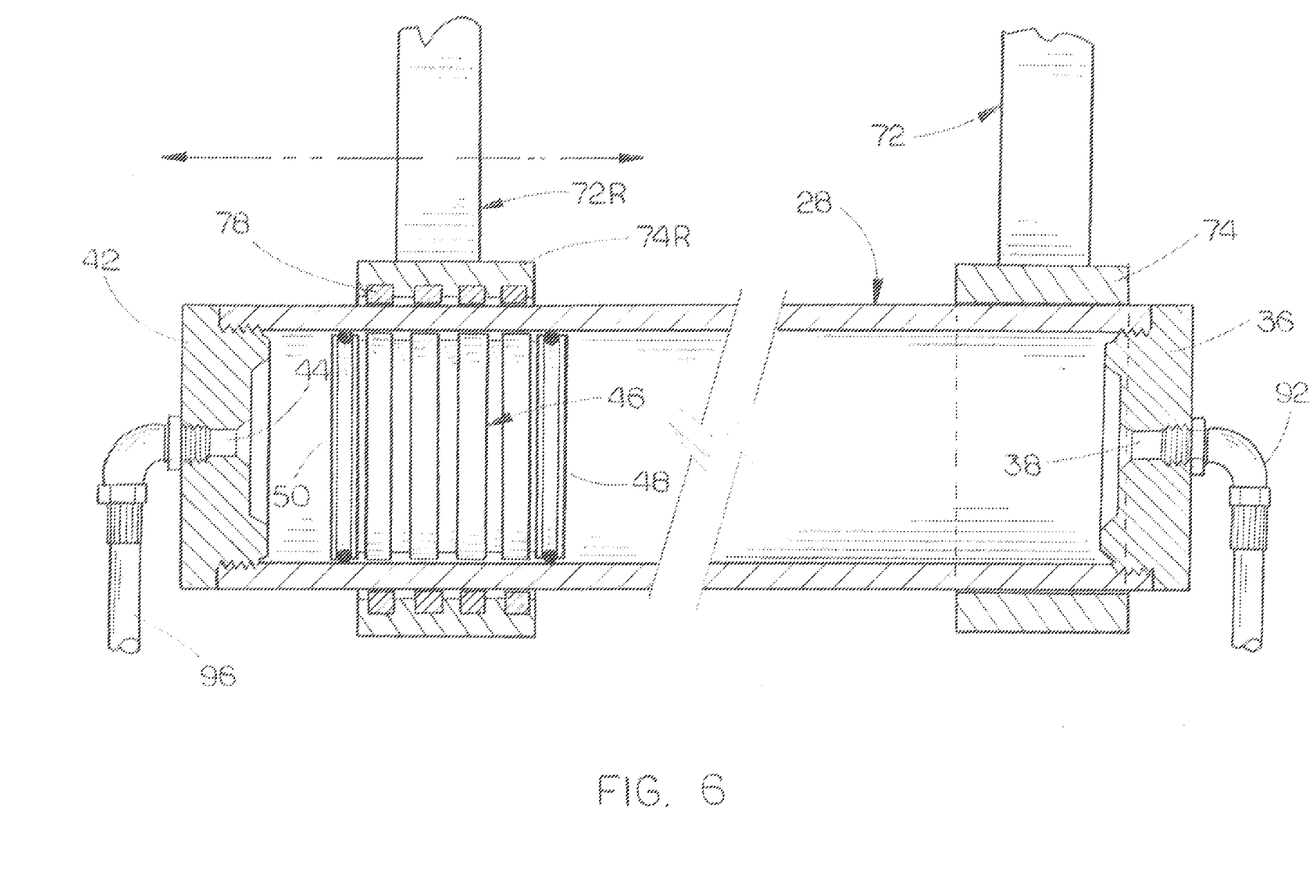
FIG. 6 is a partial sectional view of one of the rodless cylinders of this invention.

FIG. 1 illustrates a conventional trailer such as manufactured by Aulick Industries of Scottsbluff, Nebr., which is illustrated by the reference numeral 10. Although a trailer is illustrated, the invention described herein will work equally well with a straight truck body, coal cars or other types of containers, or any piece of equipment requiring a tarp. The disclosure of U.S. Pat. No. 7,484,789 is incorporated herein by reference thereto to complete the instant disclosure if necessary.

Trailer 10 includes a wheeled frame means 12 having a forward end 14, a rearward end 16, and opposite sides. Trailer 10 also includes a trailer body 18 having a forward end 20 and a rearward end 22. Trailer body 18 also includes opposite side walls having upper and lower ends with inner and outer sides. The truck or trailer body 18 includes a conventional source of fluid under pressure which would normally be supplied by the prime mover. The source of fluid under pressure may be hydraulic oil or air. The source of pressurized fluid will be described in more detail in the schematic of FIG. 7.

The retractable tarp cover system of this invention is referred to generally by the reference numeral 24 which includes a flexible tarp 26. The tarp 26 is comprised of a flexible material such as parachute material or the like. The forward or front end of the tarp 26 is secured to the forward end of the trailer body 18 so that the tarp 26 may be moved between retracted and extended positions with the side edges thereof disposed adjacent the upper ends of the side walls of the trailer body 18.

The numeral 28 refers to a first, elongated and horizontally disposed support member, having a front end 30 and a rear end 32 which is positioned at the first side of the truck body 18 at the outer side thereof adjacent the upper end thereof. Although the drawings illustrate that the support member 28 is tubular in cross-section, it could also be square in cross-section, rectangular in cross-section, octagonal, etc. The forward end or front end of support member 28 is secured to the side wall of the trailer body 18 by bracket 34 having a cap 36 secured thereto which closes the front end of the support member 28. Cap member 36 includes a central opening 38 formed therein as will be described in more detail hereinafter. The rear end of the support member 28 is secured to the side wall of the truck body 18 by a bracket 40 having a cap member 42 secured thereto which closes the rearward end of the support member 28. Cap member 42 has a central opening 44 formed therein as will be described in more detail hereinafter. The numeral 46 refers to a cylindrical inner permanent magnet piston having alternating rows of North and South magnets. For purposes of description, the piston 46 will be described as having a front end 48 and a rear end 50.

The numeral 52 refers to an elongated and horizontally disposed second support member having a front end 54 and a rear end 56. Although the support member 52 is shown to be tubular in shape, the support member 52 could have a square cross section or a rectangular cross-section. The support member 52 is secured to the other side of the trailer body at the upper end thereof in the same manner as the support member 28 is secured to the other side of the trailer body. A cap member 58 closes the front end 54 of support member 52 and has an opening 60 formed therein. Cap member 62 closes the rear end of support member 52 and has an opening 64 formed therein. The numeral 66 refers to a cylindrical inner permanent magnet piston having alternating rows of North and South magnets. For purposes of description, the piston 66 will be described as having a front end 68 and a rear end 70.

The numeral 72 refers to truck bows which have collars 74 and 76 at the opposite ends thereof which are longitudinally movable on the support members 28 and 52 respectively. The tarp 26 is secured to the tarp bows 72 in the same manner as disclosed in Applicant's earlier patent. The rearward most collar 74R includes a ring-shaped outer permanent magnet 78 therein while the rearward most collar 76R includes a ring-shaped outer permanent magnet 80 therein which is identical to the magnet 78. The collars 74R and 76R are positioned over the pistons 46 and 66 respectively and are magnetically connected thereto.

Figure 7:
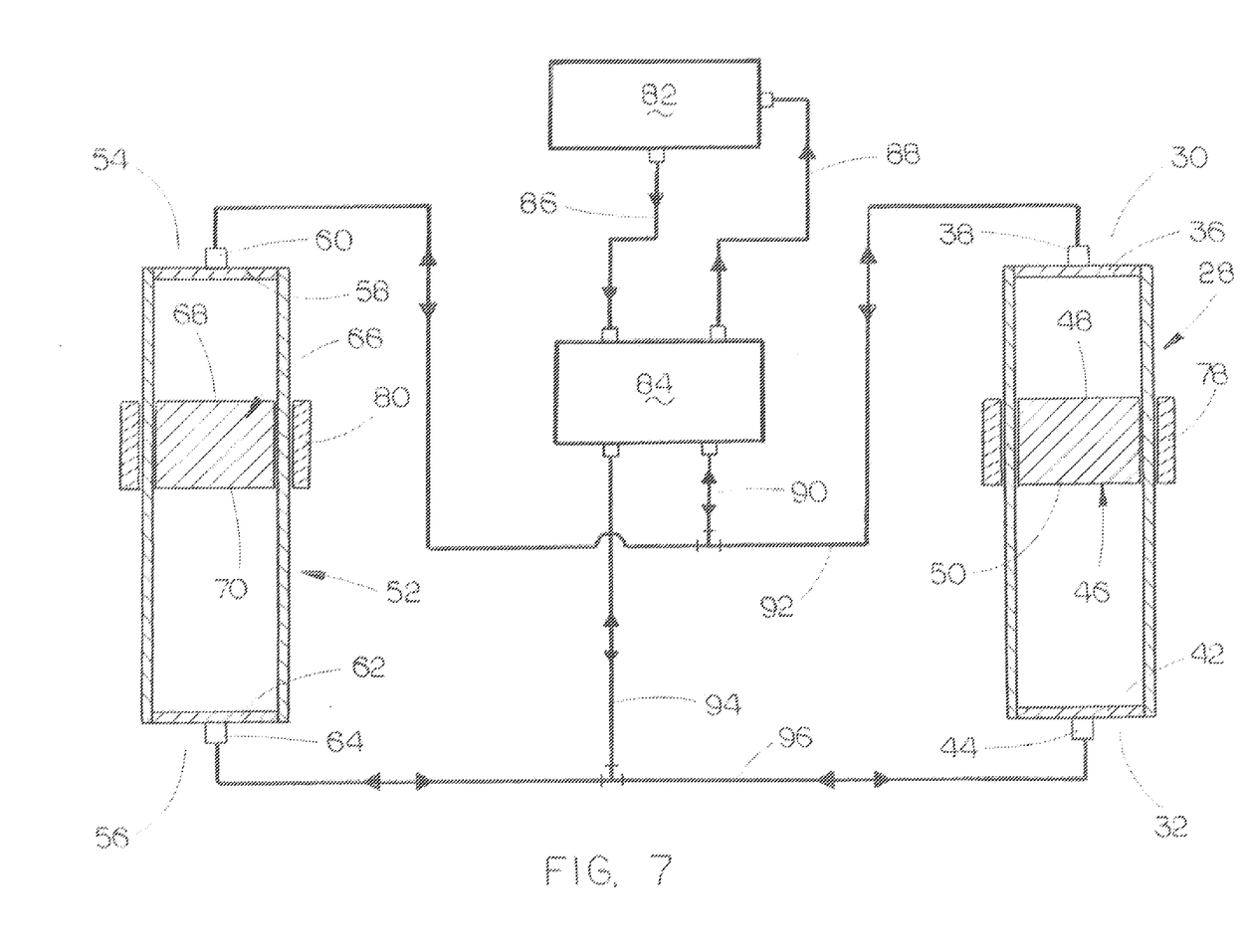
FIG. 7 is a schematic view of circuitry of this invention.

The numeral 82 refers to a source of pressurized fluid such as air or oil. The numeral 84 refers to a control valve. An inlet fluid conduit 86 extends from source 82 to control valve 84. A fluid return line or conduit 88 extends from control valve 84 to source 82. Fluid conduit 90 extends from control valve 84 to fluid conduit 92 which extends to opening 38 in cap member 36 in support member 28 and to opening 60 in cap member 58 in support member 52. Fluid conduit 94 extends from control valve 84 to fluid conduit 96 which extends to opening 44 in cap member 42 of support member 28 and to opening 64 in cap member 62 in support member 58.

Thus, when control valve 84 discharges fluid through conduit 90 into conduit 92, the pressurized fluid will enter the front ends of support members 28 and 52 to move the pistons 46 and 66 rearwardly in support members 28 and 52 which will cause the outer magnets 76 and 80 to move rearwardly in support members 28 and 52 which causes tarp bow 72R to move rearwardly with respect to support members 28 and 52 thereby causing the tarp 26 to move to is extended position over the upper end of the truck body (FIG. 1). At that same time, the fluid which is at the rearward side of the pistons 46 and 66 in support members 28 and 52 will return to source 82 by way of lines 96, 94 and 88.

When it is desired to retract the tarp 26, control valve 84 is actuated so that pressurized fluid is discharged therefrom through lines 94 and 96 into opening 44 in cap member 42 in support member 28 and into opening 64 in cap member 62 of support member 52 so that the pistons 46 and 66 will move forwardly in support members 28 and 52 which causes tarp bow 72R to move forwardly on support members 28 and 52. The forward movement of tarp bow 72R pushes the tarp bows 72 forwardly to retract the tarp 26. As the pistons 46 and 62 are moved forwardly in support members 28 and 52 respectively, the fluid at the forward sides of the pistons 46 and 66 will be returned to source 82 by way of lines 92, 90 and 88.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A retractable tarp cover system for a trailer body having front and rear ends and first and second sides having upper ends, with inner and outer sides, comprising:

a first elongated and horizontally disposed hollow support member, having a front end and a rear end, positioned at the first side of the trailer body at the outer side thereof adjacent said upper end thereof;

said front and rear ends of said first support member being secured to the first side of the trailer body at the front and rear ends thereof respectively;

a second elongated and horizontally disposed hollow support member, having a front end and a rear end, positioned at the second side of the trailer body at the outer side thereof adjacent said upper end thereof;

said front and rear ends of said second support member being secured to the second side of the trailer body at the front and rear ends thereof respectively;

said first and second support members being comprised of a non-magnetic material;

a plurality of transversely extending and spaced-apart tarp bows having first and second ends;

said first ends of said tarp bows being operatively horizontally movably mounted on said first support member in a forwardly and rearwardly direction with respect thereto;

said second ends of said tarp bows being operatively horizontally movably mounted on said second support member in a forwardly and rearwardly direction with respect thereto;

said tarp bows being positioned on said first and second support members so as to define a front tarp bow and a rear tarp bow with intermediate tarp bows therebetween;

a flexible tarp, having a front end, a rear end, and first and second sides;

said front end of said tarp being fixed in position at the front end of the trailer body;

said tarp being secured to said tarp bows and extending between the upper ends of the first and second sides of the trailer body;

said rear end of said tarp being secured to said rear tarp bow for movement therewith;

a first inner permanent magnet piston longitudinally movably mounted in said first support member;

said first inner permanent magnet piston having a front end and a rear end;

a first outer permanent magnet extending around said first support member and being longitudinally movable thereon;

said first end of said rearward tarp bow being operatively secured to said first outer permanent magnet on said first support member for longitudinal movement therewith;

a second inner permanent magnet piston longitudinally movably mounted in said second support member;

said second inner permanent magnet piston having a front end and a rear end;

a second outer permanent magnet extending around said second support member and being longitudinally movable thereon;

said second end of said rearward tarp bow being operatively secured to said second outer permanent magnet on said second support member for longitudinal movement therewith;

said first outer permanent magnet being positioned outwardly of said first inner permanent magnet piston whereby longitudinal movement of said first inner permanent magnet piston will cause said first outer permanent magnet to longitudinally move on said first support member thereby causing said first end of said rear tarp bow to longitudinally move with respect to said first support member;

said second outer permanent magnet being positioned outwardly of said second inner permanent magnet piston whereby longitudinal movement of said second inner permanent magnet piston will cause said second outer permanent magnet to longitudinally move on said second support member thereby causing said second end of said rear tarp bow to longitudinally move with respect to said second support member;

a control valve operatively connected to a source of pressurized fluid;

a first fluid conduit;

said first fluid conduit being in fluid communication with said control valve;

a second fluid conduit in fluid communication with said first fluid conduit;

said second fluid conduit being in fluid communication with said front ends of said first and second support members forwardly of said front ends of said first and second inner permanent magnet pistons;

a third fluid conduit in fluid communication with said control valve;

a fourth fluid conduit in fluid communication with said third fluid conduit;

said fourth fluid conduit being in fluid communication with said rear ends of said first and second support members rearwardly of said rear ends of said first and second inner permanent pistons;

said control valve capable of simultaneously supplying pressurized fluid into said front ends of said first and second support members by way of said first and second fluid conduits thereby causing said first and second permanent magnet pistons to move rearwardly in said first and second support members respectively which causes said first and second outer permanent magnets to move rearwardly on said first and second support members;

said control valve capable of simultaneously supplying pressurized fluid into said rear ends of said first and second support members by way of said third and fourth fluid conduits thereby causing said first and second permanent magnet pistons to move forwardly in said first and second support members respectively which causes said first and second outer permanent magnets to move forwardly on said first and second support members.

2. The system of claim 1 wherein each of said first and second support members are tubular.

3. The system of claim 1 wherein each of said first and second inner permanent magnet pistons are cylindrical in shape.

4. The system of claim 1 wherein each of said first and second outer permanent magnets are ring-shaped.

5. A retractable tarp cover system for a truck body having front and rear ends and first and second sides having upper ends, with inner and outer sides, comprising:

a first elongated and horizontally disposed hollow support member, having a front end and a rear end, positioned at the first side of the truck body at the outer side thereof adjacent said upper end thereof;

said front and rear ends of said first support member being secured to the first side of the truck body at the front and rear ends thereof respectively;

a second elongated and horizontally disposed hollow support member, having a front end and a rear end, positioned at the second side of the truck body at the outer side thereof adjacent said upper end thereof;

said front and rear ends of said second support member being secured to the second side of the truck body at the front and rear ends thereof respectively;

said first and second support members being comprised of a non-magnetic material;

a plurality of transversely extending and spaced-apart tarp bows having first and second ends;

said first ends of said tarp bows being operatively horizontally movably mounted on said first support member in a forwardly and rearwardly direction with respect thereto;

said second ends of said tarp bows being operatively horizontally movably mounted on said second support member in a forwardly and rearwardly direction with respect thereto;

said tarp bows being positioned on said first and second support members so as to define a front tarp bow and a rear tarp bow with intermediate tarp bows therebetween;

a flexible tarp, having a front end, a rear end, and first and second sides;

said front end of said tarp being fixed in position at the front end of the truck body;

said tarp being secured to said tarp bows and extending between the upper-ends of the first and second sides of the truck body;

said rear end of said tarp being secured to said rear tarp bow for movement therewith;

a first inner permanent magnet piston longitudinally movably mounted in said first support member;

said first inner permanent magnet piston having a front end and a rear end;

a first outer permanent magnet extending around said first support member and being longitudinally movable thereon;

said first end of said rearward tarp bow being operatively secured to said first outer permanent magnet on said first support member for longitudinal movement therewith;

a second inner permanent magnet piston longitudinally movably mounted in said second support member;

said second inner permanent magnet piston having a front end and a rear end;

a second outer permanent magnet extending around said second support member and being longitudinally movable thereon;

said second end of said rearward tarp bow being operatively secured to said second outer permanent magnet on said second support member for longitudinal movement therewith;

said first outer permanent magnet being positioned outwardly of said first inner permanent magnet piston whereby longitudinal movement of said first inner permanent magnet piston will cause said first outer permanent magnet to longitudinally move on said first support member thereby causing said first end of said rear tarp bow to longitudinally move with respect to said first support member;

said second outer permanent magnet being positioned outwardly of said second inner permanent magnet piston whereby longitudinal movement of said second inner permanent magnet piston will cause said second outer permanent magnet to longitudinally move on said second support member thereby causing said second end of said rear tarp bow to longitudinally move with respect to said second support member;

a control valve operatively connected to a source of pressurized fluid;

a first fluid conduit;

said first fluid conduit being in fluid communication with said control valve;

a second fluid conduit in fluid communication with said first fluid conduit;

said second fluid conduit being in fluid communication with said front ends of said first and second support members forwardly of said front ends of said first and second inner permanent magnet pistons;

a third fluid conduit in fluid communication with said control valve;

a fourth fluid conduit in fluid communication with said third fluid conduit;

said fourth fluid conduit being in fluid communication with said rear ends of said first and second support members rearwardly of said rear ends of said first and second inner permanent magnet pistons;

said control valve capable of simultaneously supplying pressurized fluid into said front ends of said first and second support members by way of said first and second fluid conduits thereby causing said first and second permanent magnet pistons to move rearwardly in said first and second support members respectively which causes said first and second outer permanent magnets to move rearwardly on said first and second support members;

said control valve capable of simultaneously supplying pressurized fluid into said rear ends of said first and second support members by way of said third and fourth fluid conduits thereby causing said first and second permanent magnet pistons to move forwardly in said first and second support members respectively which causes said first and second outer permanent magnets to move forwardly on said first and second support members.

6. The system of claim 5 wherein each of said first and second support members are tubular.

7. The system of claim 5 wherein each of said first and second inner permanent magnet pistons are cylindrical in shape.

8. The system of claim 5 wherein each of said first and second outer permanent magnets are ring-shaped.

9. A retractable tarp cover system for a container having front and rear ends and first and second sides having upper ends, with inner and outer sides, comprising:

a first elongated and horizontally disposed hollow support member, having a front end and a rear end, positioned at the first side of the container at the outer side thereof adjacent said upper end thereof;

said front and rear ends of said first support member being secured to the first side of the container at the front and rear ends thereof respectively;

a second elongated and horizontally disposed hollow support member, having a front end and a rear end, positioned at the second side of the container at the outer side thereof adjacent said upper end thereof;

said front and rear ends of said second support member being secured to the second side of the container at the front and rear ends thereof respectively;

said first and second support members being comprised of a non-magnetic material;

a plurality of transversely extending and spaced-apart tarp bows having first and second ends;

said first ends of said tarp bows being operatively horizontally movably mounted on said first support member in a forwardly and rearwardly direction with respect thereto;

said second ends of said tarp bows being operatively horizontally movably mounted on said second support member in a forwardly and rearwardly direction with respect thereto;

said tarp bows being positioned on said first and second support members so as to define a front tarp bow and a rear tarp bow with intermediate tarp bows therebetween;

a flexible tarp, having a front end, a rear end, and first and second sides;

said front end of said tarp being fixed in position at the front end of the container;

said tarp being secured to said tarp bows and extending between the upper ends of the first and second sides of the container;

said rear end of said tarp being secured to said rear tarp bow for movement therewith;

a first inner permanent magnet piston longitudinally movably mounted in said first support member;

said first inner permanent magnet piston having a front end and a rear end;

a first outer permanent magnet extending around said first support member and being longitudinally movable thereon;

said first end of said rearward tarp bow being operatively secured to said first outer permanent magnet on said first support member for longitudinal movement therewith;

a second inner permanent magnet piston longitudinally movably mounted in said second support member;

said second inner permanent magnet piston having a front end and a rear end;

a second outer permanent magnet extending around said second support member and being longitudinally movable thereon;

said second end of said rearward tarp bow being operatively secured to said second outer permanent magnet on said second support member for longitudinal movement therewith;

said first outer permanent magnet being positioned outwardly of said first inner permanent magnet piston whereby longitudinal movement of said first inner permanent magnet piston will cause said first outer permanent magnet to longitudinally move on said first support member thereby causing said first end of said rear tarp bow to longitudinally move with respect to said first support member;

said second outer permanent magnet being positioned outwardly of said second inner permanent magnet piston whereby longitudinal movement of said second inner permanent magnet piston will cause said second outer permanent magnet to longitudinally move on said second support member thereby causing said second end of said rear tarp bow to longitudinally move with respect to said second support member;

a control valve operatively connected to a source of pressurized fluid;

a first fluid conduit;

said first fluid conduit being in fluid communication with said control valve;

a second fluid conduit in fluid communication with said first fluid conduit;

said second fluid conduit being in fluid communication with said front ends of said first and second support members forwardly of said front ends of said first and second inner permanent magnet pistons;

a third fluid conduit in fluid communication with said control valve;

a fourth fluid conduit in fluid communication with said third fluid conduit;

said fourth fluid conduit being in fluid communication with said rear ends of said first and second support members rearwardly of said rear ends of said first and second inner permanent magnet pistons;

said control valve capable of simultaneously supplying pressurized fluid into said front ends of said first and second support members by way of said first and second fluid conduits thereby causing said first and second permanent magnet pistons to move rearwardly in said first and second support members respectively which causes said first and second outer permanent magnets to move rearwardly on said first and second support members;

said control valve capable of simultaneously supplying pressurized fluid into said rear ends of said first and second support members by way of said third and fourth fluid conduits thereby causing said first and second permanent magnet pistons to move forwardly in said first and second support members respectively which causes said first and second outer permanent magnets to move forwardly on said first and second support members.

10. The system of claim 9 wherein each of said first and second support members are tubular.

11. The system of claim 9 wherein each of said first and second inner permanent magnet pistons are cylindrical in shape.

12. The system of claim 9 wherein each of said first and second outer permanent magnets are ring-shaped.

13. A retractable tarp cover system for a container having front and rear ends and first and second sides having upper ends, with inner and outer sides, comprising:

a first elongated and horizontally disposed hollow support member, having a front end and a rear end, positioned at the first side of the container at the outer side thereof adjacent said upper end thereof;

said front and rear ends of said first support member being secured to the first side of the container at the front and rear ends thereof respectively;

a second elongated and horizontally disposed hollow support member, having a front end and a rear end, positioned at the second side of the container at the outer side thereof adjacent said upper end thereof;

said front and rear ends of said second support member being secured to the second side of the container at the front and rear ends thereof respectively;

said first and second support members being comprised of a non-magnetic material;

a plurality of transversely extending and spaced-apart tarp bows having first and second ends;

said first ends of said tarp bows being operatively horizontally movably mounted on said first support member in a forwardly and rearwardly direction with respect thereto;

said second ends of said tarp bows being operatively horizontally movably mounted on said second support member in a forwardly and rearwardly direction with respect thereto;

said tarp bows being positioned on said first and second support members so as to define a front tarp bow and a rear tarp bow with intermediate tarp bows therebetween;

a flexible tarp, having a front end, a rear end, and first and second sides;

said front end of said tarp being fixed in position at the front end of the container;

said tarp being secured to said tarp bows and extending between the upper ends of the first and second sides of the container;

said rear end of said tarp being secured to said rear tarp bow for movement therewith;

a first inner permanent magnet piston longitudinally movably mounted in said first support member;

said first inner permanent magnet piston having a front end and a rear end;

a first outer permanent magnet extending around said first support member and being longitudinally movable thereon;

said first end of said rearward tarp bow being operatively secured to said first outer permanent magnet on said first support member for longitudinal movement therewith;

a second inner permanent magnet piston longitudinally movably mounted in said second support member;

said second inner permanent magnet piston having a front end and a rear end;

a second outer permanent magnet extending around said second support member and being longitudinally movable thereon;

said second end of said rearward tarp bow being operatively secured to said second outer permanent magnet on said second support member for longitudinal movement therewith;

said first outer permanent magnet being positioned outwardly of said first inner permanent magnet piston whereby longitudinal movement of said first inner permanent magnet piston will cause said first outer permanent magnet to longitudinally move on said first support member thereby causing said first end of said rear tarp bow to longitudinally move with respect to said first support member;

said second outer permanent magnet being positioned outwardly of said second inner permanent magnet piston whereby longitudinal movement of said second inner permanent magnet piston will cause said second outer permanent magnet to longitudinally move on said second support member thereby causing said second end of said rear tarp bow to longitudinally move with respect to said second support member;

a control valve operatively fluidly connected to a source of pressurized fluids and operatively fluidly connected to said front and rear ends of said first and second support members;

said control valve capable of simultaneously supplying pressurized fluid into said front ends of said first and second support members thereby causing said first and second permanent magnet pistons to move rearwardly in said first and second support members respectively which causes said first and second outer permanent magnets to move rearwardly on said first and second support members;

said control valve capable of simultaneously supplying pressurized fluid into said rear ends of said first and second support members thereby causing said first and second permanent magnet pistons to move forwardly in said first and second support members respectively which causes said first and second outer permanent magnets to move forwardly on said first and second support members.

14. The system of claim 13 wherein each of said first and second support members are tubular.

15. The system of claim 13 wherein each of said first and second inner permanent magnet pistons are cylindrical in shape.

16. The system of claim 13 wherein each of said first and second outer permanent magnets are ring-shaped.

* * * * *